Feb. 3, 1953 R. M. HESSERT 2,627,203
DOCUMENT PHOTOGRAPHING MACHINE
Original Filed Jan. 14, 1943 10 Sheets-Sheet 1

INVENTOR
Raymond M. Hessert
BY Roland J. Booth
ATTORNEY

Feb. 3, 1953 R. M. HESSERT 2,627,203
DOCUMENT PHOTOGRAPHING MACHINE
Original Filed Jan. 14, 1943 10 Sheets-Sheet 7
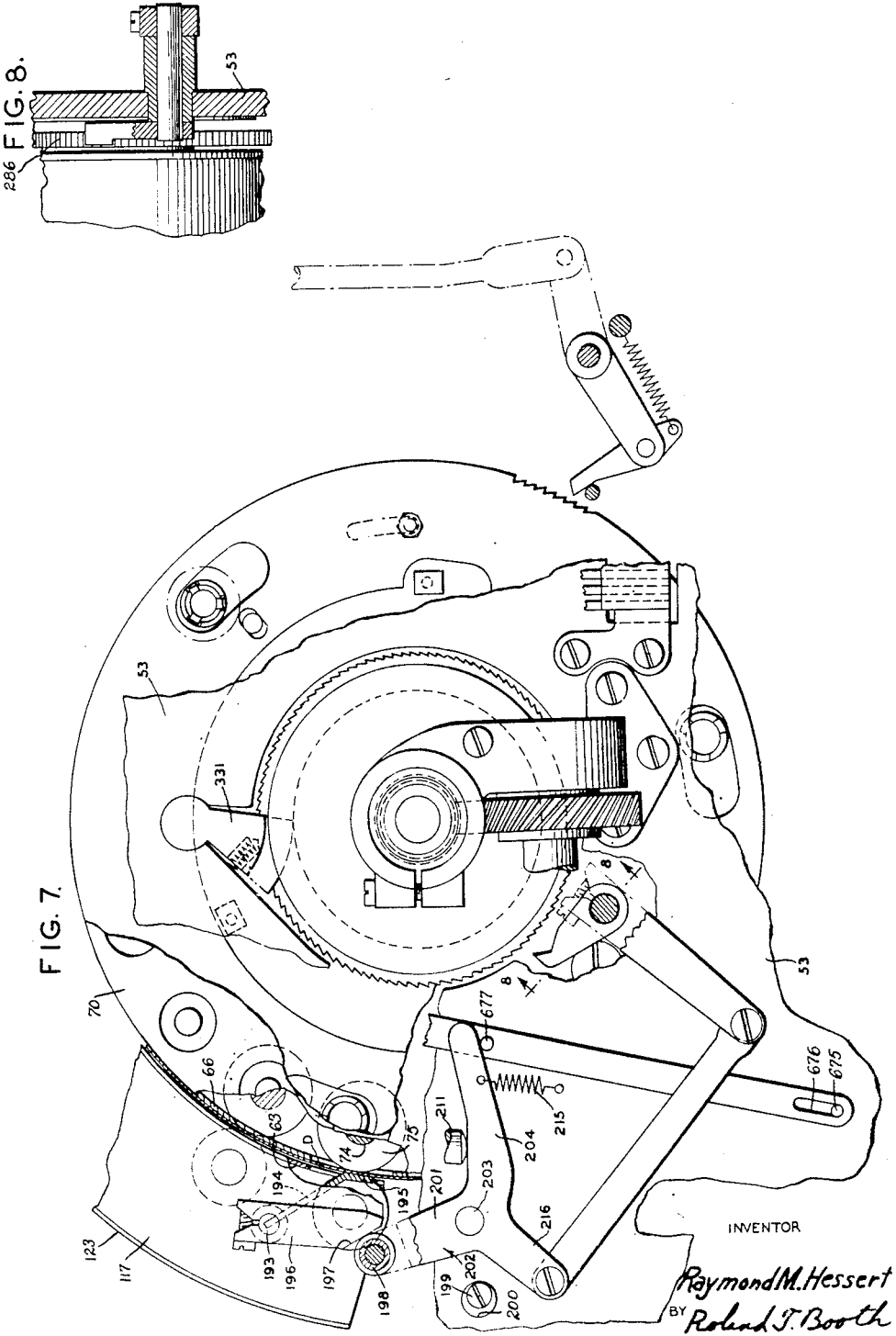
INVENTOR
Raymond M. Hessert
BY Roland T. Booth
ATTORNEY Feb. 3, 1953 R. M. HESSERT 2,627,203
DOCUMENT PHOTOGRAPHING MACHINE
Original Filed Jan. 14, 1943 10 Sheets-Sheet 8

INVENTOR
Raymond M. Hessert
BY Roland T. Booth
ATTORNEY

Feb. 3, 1953 R. M. HESSERT 2,627,203
DOCUMENT PHOTOGRAPHING MACHINE
Original Filed Jan. 14, 1943 10 Sheets-Sheet 9
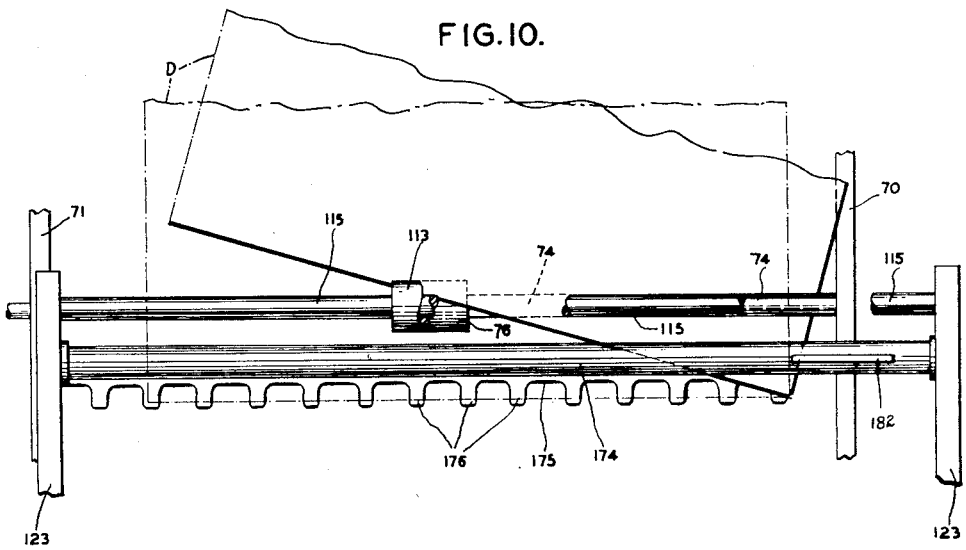
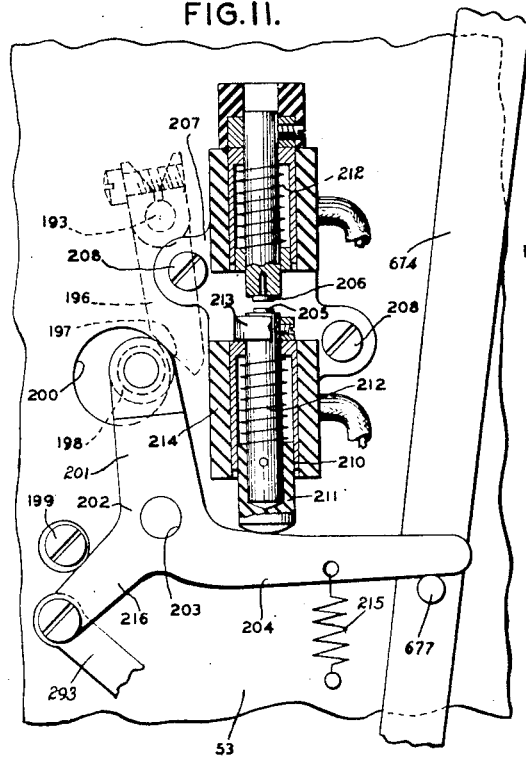
INVENTOR
Raymond M. Hessert
BY
Roland T. Booth
ATTORNEY Feb. 3, 1953 — R. M. HESSERT — 2,627,203
DOCUMENT PHOTOGRAPHING MACHINE
Original Filed Jan. 14, 1943 — 10 Sheets-Sheet 10
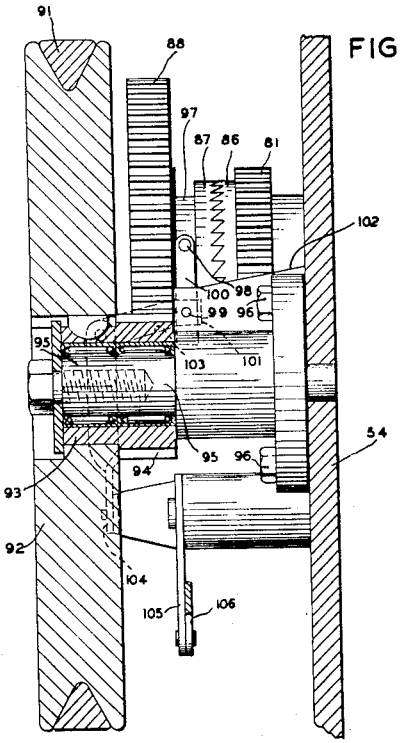
INVENTOR
Raymond M. Hessert
by Roland J. Booth
ATTORNEY Patented Feb. 3, 1953

2,627,203

UNITED STATES PATENT OFFICE 2,627,203

DOCUMENT PHOTOGRAPHING MACHINE

Raymond M. Hessert, Larchmont, N. Y.

Original application January 14, 1943, Serial No. 472,359. Divided and this application July 8, 1949, Serial No. 103,650

15 Claims. (Cl. 88—24)

This invention relates to a document photographing machine particularly adapted for rapidly photographing bank checks, statements, index cards, letter and similar sheets. This application is a division of application Ser. No. 472,359 filed January 14, 1943, now Patent No. 2,492,127.

The invention comprehends the provision of a document photographic machine that will photograph documents of varying size, with particular reference to the length of the document from the top to the bottom thereof which may vary in length to any extent and be photographed in a manner that will provide a single continuous image of the document on a film strip.

The invention comprehends the provision of a document photographing machine having a feed mechanism for automatically receiving and feeding documents of various sizes successively through the photographic plane and then discharging the documents in successive order from the machine, while suitable document controlled mechanism feeds only sufficient film to obtain an image of the document and then discontinues the film feed. A source of illumination is controlled by the document for providing sufficient light to illuminate the document as it passes through the photographic plane for photographing on the film.

The invention provides a convenient structural assembly for the document feeding mechanism with the illuminating structure associated therewith in a manner that each may be conveniently swung out of normal operative position into an inoperative position to provide ready access to the entire mechanism for inspection, repair and replacement; and the provision of a light indicator for registering to the machine operator when one or more of the lamp bulbs of the illuminating system are burned out or extinguished.

The invention comprehends the provision of a document feed structure having a plurality of rollers arranged in a manner to provide a partially cylindrical feed path to the document for flexing the document into curved form during feeding through the machine past the photographic plane for obtaining a more uniform feeding of documents past the photographic plane wherein the feed rollers are arranged to cooperate for bending the document into curved form as it is fed through the machine in order to obtain efficient feeding of documents of varying size through the machine for photographing, with the reduction of friction and noise in the operation of the machine.

In the drawings:

Fig. 7 is an enlarged fragmentary side elevation looking from the left hand side of the machine showing the document controlled device for starting the film feed drive mechanism in feeding position.

Fig. 8 is a fragmentary cross section taken substantially along the line 8—8 of Fig. 7 disclosing in detail the ratchet and pawl arrangement for controlling indexing and film feed operations.

Fig. 10 is an enlarged fragmentary top plan view of the document straightening device.

Fig. 11 is an enlarged detail side view, partly in cross section, showing the light switch and its associated mechanism.

Fig. 12 is a top plan view partly in cross section of the switch shown in Fig. 11.

Fig. 13 is an enlarged detail cross section showing the document straightening device taken substantially along the line 13—13 of Fig. 5 and looking from the left-hand side of the machine.

Fig. 14 is an enlarged cross section taken substantially along the line 14—14 of Fig. 2, disclosing the clutch mechanism for operating the document feed rolls.

Fig. 15 is an enlarged fragmentary transverse cross section showing the pressures feed rolls and the drive feed rolls in relation to the stationary cylinder of the document feed mechanism.

Fig. 16 is a circuit diagram for the machine.

Frames

Figure 1:
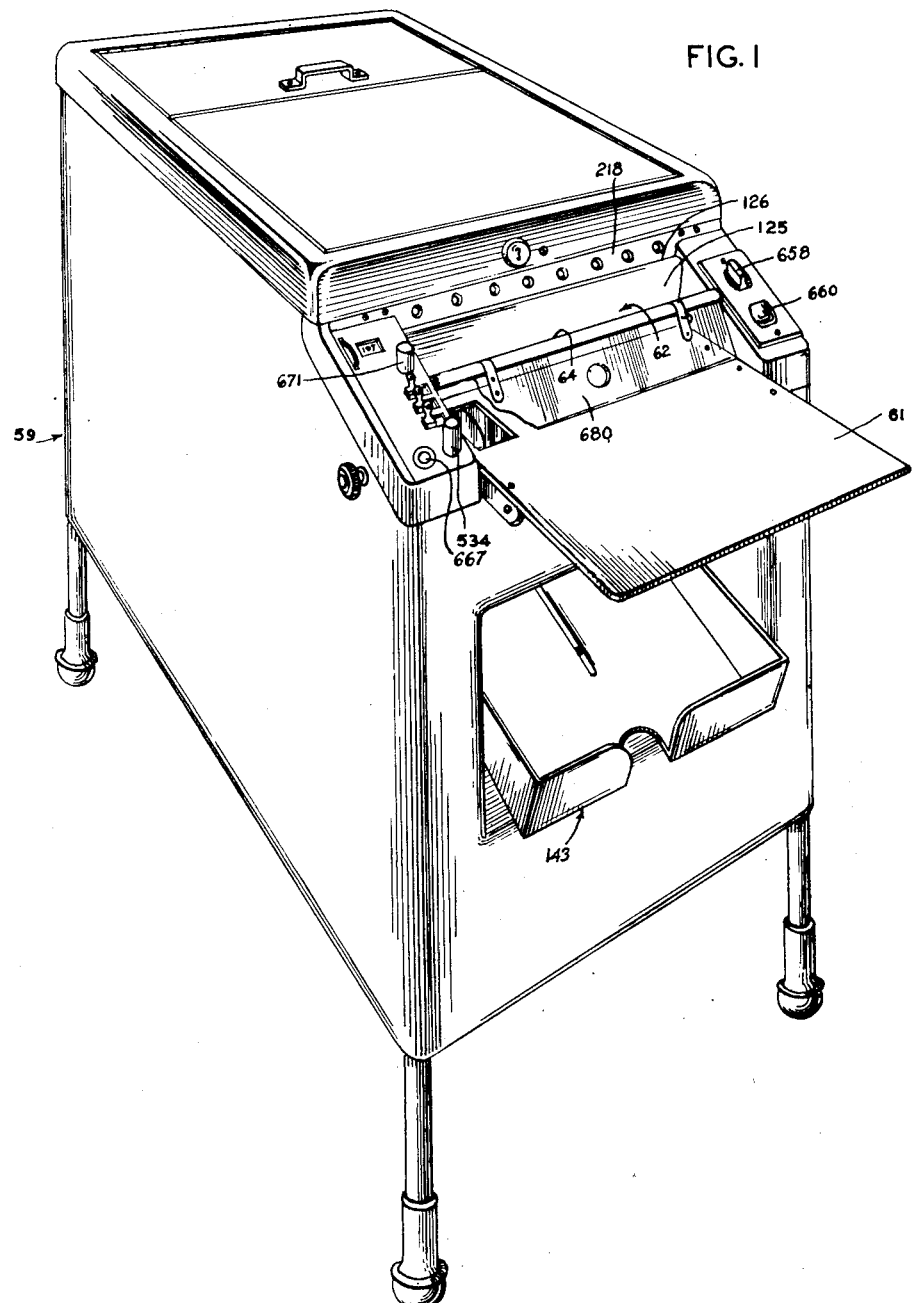
Fig. 1 is a perspective showing the front end of the machine disclosing the location of the controls, indicators and the feed and discharge openings.

Referring to Figs. 1, 2, 3, and 4, the present machine is mounted generally upon a movable truck or base 50 having secured at its upper structure thereof a pair of longitudinally extending side bars 51 and 52. Located at the front of the machine and secured to the inner sides of side bars 51 and 52 by screws 55 is a pair of upright frame walls 53 and 54 which are prevented from lateral displacement by tie rods 56. The frame walls 53 and 54 are adapted to support the document feeding mechanism, the lighting device, the indexing mechanism and its controls, and the control keyboard of the machine. Located midway between the ends of side bars 51 and 52 and secured thereto is a cross plate 57 upon which is mounted a suitable motor 58 for driving the various units of the present machine. Located at the rear of the machine and secured to side bars 51 and 52 is another cross plate 60, upon which rests the camera unit and the drive mechanism for feeding the film. The machine is enclosed within and rendered light-proof and sound-proof by a suitable casing 59 which is secured to side bars 51 and 52.

Document drive and feed mechanisms

Figure 9:
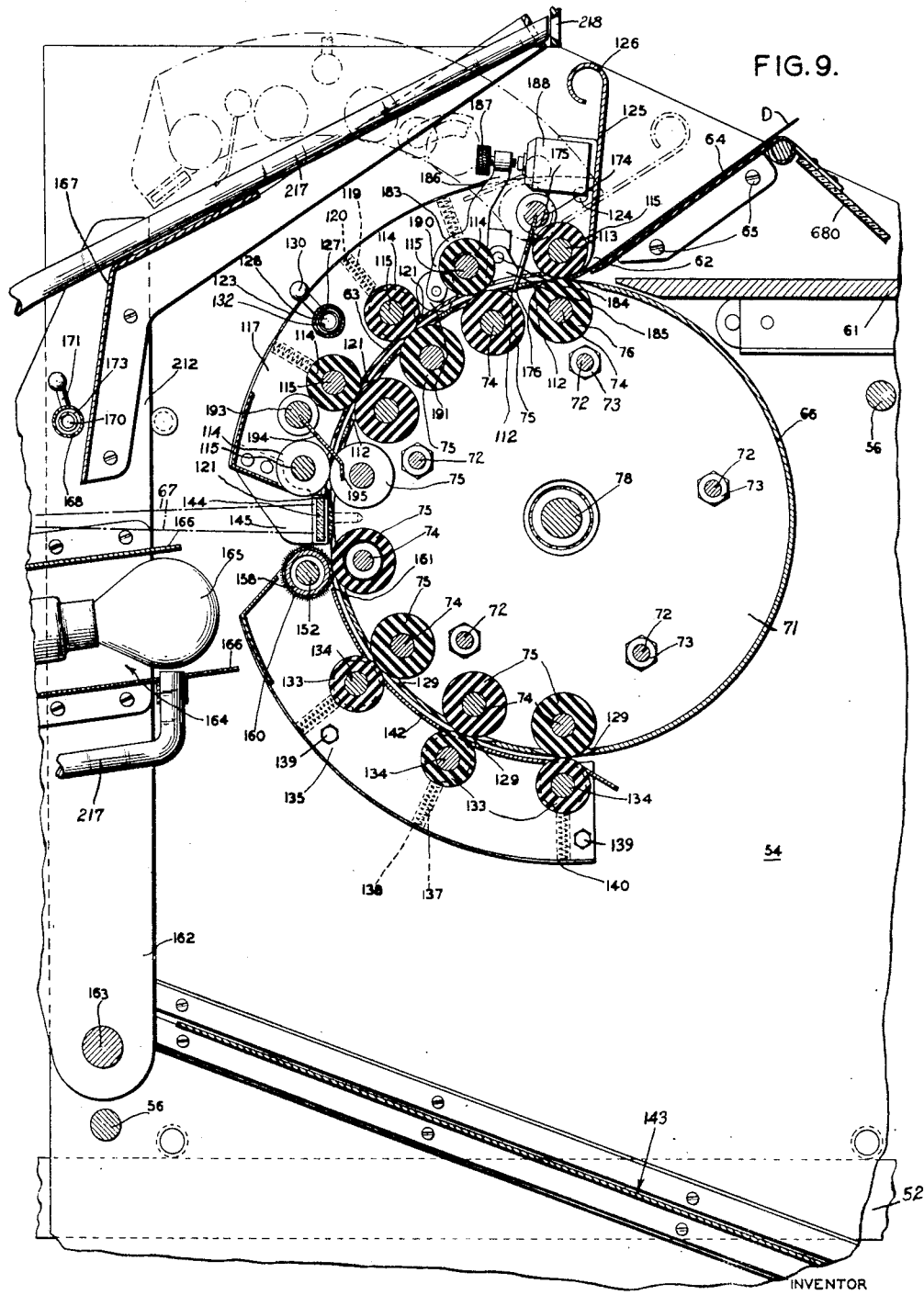
Fig. 9 is a cross section taken substantially along the line 9—9 of Fig. 4 looking from the left-hand side of the machine and disclosing the document feed roll assembly.

Before the documents designated by the character D in Figs. 7, 9 and 15 are fed into the present machine, they are first arranged in groups and stacked upon a table 61. Table 61 is slidably and removably mounted upon frame walls 53 and 54 on suitable brackets carried by said walls. The documents are then fed one at a time through a throat 62 (Fig. 9) formed by the front portion of an arcuate guide plate 63 forming part of an upper guide unit and the rear edge of an auxiliary table 64. The table 64 extends transversely between and is secured to the frame plates 53 and 54 by screws 65. The documents are then fed around a stationary cylinder 66 by means to be described, past a focal range shown in dot and dash lines in Figs. 4 and 9, and indicated by the reference numeral 67, of a photographic apparatus broadly designated as 68. The photographic apparatus 68 may be a duplex camera of the motion picture type.

Figure 2:
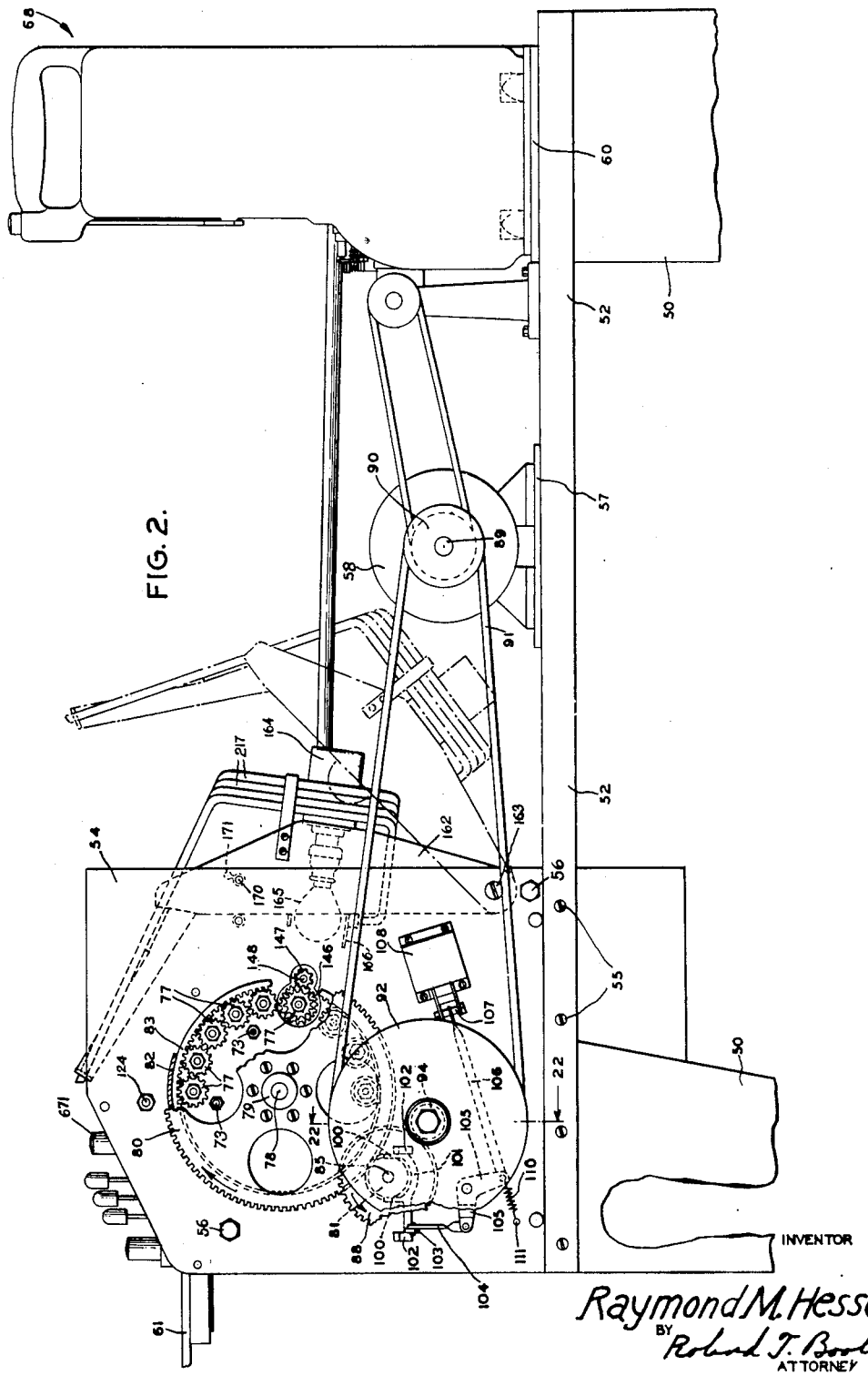
Fig. 2 is a side elevation looking at the right-hand side of the machine with the outside casing removed, portions being broken away and shown in section to illustrate some of the structural details.
Figure 6:
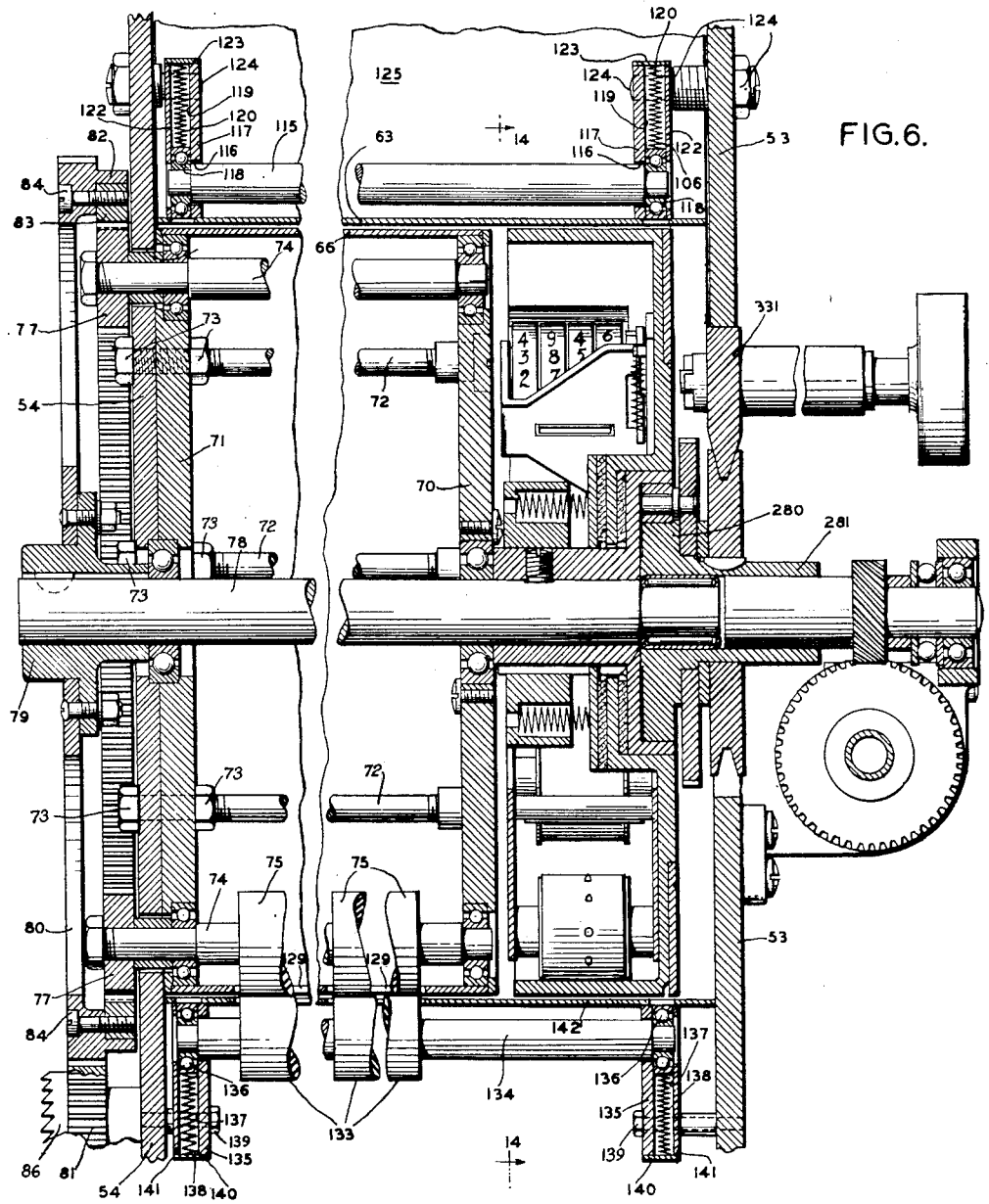
Fig. 6 is an enlarged fragmentary cross section taken substantially along line 6—6 of Fig. 3 looking from the rear and disclosing the drive mechanism for the document feeding and indexing devices.

Referring to Figs. 2, 6, and 9, cylinder 66 extends between end frame walls 53 and 54 and is provided with a left and right-hand end wall 70 and 71, respectively, the inner face of each of which is formed with an annular shoulder to receive one end of cylinder 66. Cylinder 66 and end walls 70 and 71 form a unitary structure held rigidly together by means of a plurality of tie rods 72, one end of which terminates in the end wall 70 and the other end of which passes through walls 71 and 54 and are secured thereto by means of nuts 73. Extending longitudinally within and arranged in an arcuate line concentric with the cylinder 66 is a plurality of shafts 74, nine in number. Each of the shafts 74 except the topmost (see Fig. 9) has secured thereto a plurality of feed rolls 75. The topmost shaft 74 has secured thereto a single feed roll 76 (Fig. 10) of limited width for reasons which will hereinafter appear. Each of the shafts 74 is journaled at its left-hand end (right Fig. 6) in the end wall 70 and journaled near its right-hand end in the wall 71. The right-hand end of each shaft extends beyond the wall 71, through an opening in the wall 54, and has secured thereto a gear 77. The means for rotating the feed roll shafts 74 will now be described.

Located within cylinder 66 in axial relation therein is a main drive shaft 78 which extends longitudinally of said cylinder and is journaled toward its left-hand end (Fig. 6) in the walls 54 and 71 and toward its right-hand end in the wall 70. The left-hand end of the shaft 78, Fig. 6, extends beyond frame wall 54 and has secured thereto a flanged hub 79 to which is secured a gear 80 constantly in mesh with another gear 81. The gear 80 is formed with an annular flange 82 within which seats an internal gear 83 secured to gear 80 by screws 84. The gear 83 meshes with all of the gears 77 fixed to feed roll shafts 74. As is best shown in Figs. 2 and 14, gear 81 is rotatably mounted upon a stub shaft 85 extending outwardly from and fixed to frame wall 54 and has formed integral therewith a clutch disc 86. This disc 86 has teeth which are normally in engagement with the teeth of a continuously rotating clutch disc 87 also rotatably mounted upon the stub shaft 85. Disc 87 is formed integral with a gear 88 driven by means now to be described. The motor 58 is adapted to drive a shaft 89 which has secured thereto a pulley 90 connected by belt 91 to another pulley 92 (Figs. 2, 4 and 14) keyed to hub 93, of gear 94 rotatably mounted upon stub shaft 95 secured to frame wall 54 by bolts 96.

From the foregoing it will be seen that clockwise rotation of shaft 89 will rotate pulley 92 and gear 94 in a clockwise direction (Fig. 2) which in turn will rotate gear 88 in a clockwise direction through gear 88, clutch discs 87 and 86 and gear 81. Rotation of gear 80 will, through the internal gear 83 and gears 77 rotate all of the feed rolls 75 in a clockwise direction (counterclockwise as shown in Fig. 9).

In order to disengage clutch discs 86 and 87 to stop the rotation of feed rolls 75, clutch disc 87 is formed with a channelled portion 97 (Fig. 14) adapted to receive a pair of pins or studs 98 individually secured to a pair of upright arms 100 integral with a bell-crank 101 (Fig. 2) mounted for rocking movement upon a pair of brackets 102 secured to frame wall 54. Another arm 103 on bell-crank 101 has the upper end of a link 104 pivotally connected thereto, the lower end of said link being connected to one arm of a bell-crank 105 pivotally mounted upon frame wall 54. The other arm of bell-crank 105 is pivoted to a forwardly extending link 106, which link has the rear end connected to armature 107 of a normally deenergized solenoid 108. The link and armature 106 and 107, respectively, are urged to the front of the machine by means of spring 110 connected at one end to pin 111 fixed to frame wall 54 and the other end connected to bell-crank 105. This spring 110 also urges clutch members 86 and 87 into operative engagement.

The construction is such that when solenoid 108 is energized, by means fully described in the aforementioned application, armature 107 and link 106 will be drawn to the right (Fig. 2) against the tension of spring 110 to rock bell-crank 105 in a counterclockwise direction. This will cause downward movement of bell-crank 105 to rock bell-crank 101 which through arms 100 and pins 98 moves clutch disc 87 axially along shaft 85 out of engagement with clutch disc 86. Upon the deenergization of solenoid 108, spring 110 will cause clutch disc 87 to move back to its normal engaging position.

Referring to Figs. 6 and 9 it will be recalled that there are provided nine shafts 74 within cylinder 66, the topmost shaft having a single feed roll 76 mounted thereon and each of the remaining eight shafts mounting a plurality of feed rolls 75. Beginning with the topmost shaft 74 and counting in a counterclockwise direction in Fig. 9, feed rolls 75 and 76 secured to the first five shafts 74 have the peripheries extending slightly beyond the outer periphery of cylinder 66 through rectangular slots or openings 112 (see also Figs. 5 and 15) formed in the cylinder. The topmost feed roll 76 cooperates with an associated pressure roll 113 (Figs. 9 and 10) and the remaining four groups of feed rolls 75 cooperate with associated pressure rolls 114. The pressure rolls 113 and 114 form part of the upper guide unit and are secured to shafts 115 the ends of which extend through openings 116 formed in a pair of arcuate frame plates 117 and are journaled in bearings 118.

Bearings 118 (Fig. 6) are guided for radial movement in grooves 119 formed in plates 117 of the upper guide unit and are urged by springs 120 disposed in grooves 119 in a direction whereby pressure rolls 113 and 114 are brought into engagement with the feed rolls 76 and 75, respectively. Bearings 118 are retained in their respective grooves 119 by the previously described arcuate guide plate 63 secured at its ends to the underside of plates 117. The diameter of the inner periphery of guide plate 63 is slightly greater than the diameter of the outer periphery of cylinder 66 to permit passage of a document D between the cylinder and guide plate.

Slots 121 are provided in guide plate 63 through which the peripheries of pressure rolls 113 and 114 slightly protrude to engage feed rolls 75 and 76 respectively. A retainer plate 122 is secured to and is in spaced parallel relation to the outer face of each frame plate 117 for preventing lateral displacement of bearings 118 and springs 120. Secured to the outer periphery of each of frame plates 117 is a retainer strip 123 against the inner face of which bears one end of each spring 120.

In order to facilitate adjustment and repair of the pressure and feed rolls and also to facilitate the removal of documents which may have been jammed between said rolls during feeding thereof, the pressure rolls 113 and 114 and their mounting as above described, form a structural unit referred to as the upper guide unit, pivoted upon a pair of studs 124 individually secured to the frame walls 53 and 54.

The arcuate guide plate 63 is provided with an upright wall 125 the top portion of which is bent to form a finger piece 126 by which the unitary structure may be rocked from a normal operating position shown in full lines to an open inoperative position shown in dot and dash lines in Fig. 9.

Figure 5:
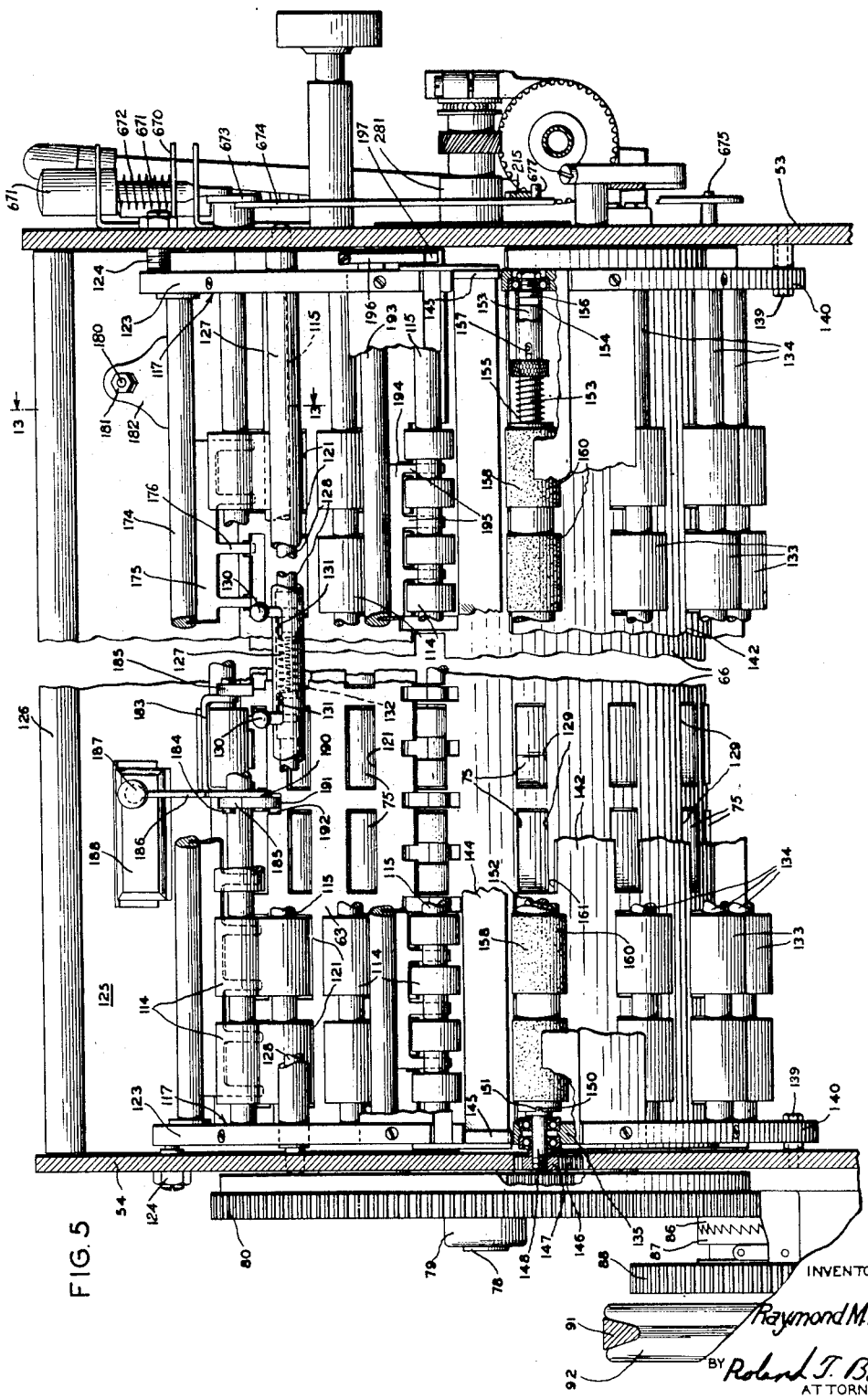
Fig. 5 is an enlarged fragmentary cross section taken substantially along the line 5—5 of Fig. 3 and disclosing the document feeding mechanism.

A tube 127 is located between and has its ends secured to the two frame members 117, as best shown in Figs. 5 and 9. A pair of plungers 128 is disposed in tube 127 and have the outer ends extending beyond the ends of said tube for engaging in openings formed in upright walls 53 and 54 when the pressure rolls are in effective position (full lines in Fig. 9). The inner ends of said plungers are provided with finger pieces 130 which extend through longitudinal slots 131 in tube 127. A compression spring 132 disposed between the inner ends of the plungers serves to urge the plungers axially apart.

When it is desired to move the upper guide unit from the operative position shown in full lines to the dot and dash line position, in Fig. 9, the finger pieces 130 are first brought together against the tension of spring 132, moving the outer ends of plungers 128 out of the openings in the frame walls. The unit is then rocked in a clockwise direction (Fig. 9) about its pivot 124 until the outer ends of the plungers are above the upper edge of frame walls 53 and 54. It will be seen that, if the plungers are then released, they will be moved further apart through the action of spring 132 so that the outer ends thereof will rest upon the upper edge of the frame walls and hold the unit in the open inoperative position.

It has been previously described that there are nine driven feed roll shafts 74, the first five of which, beginning from the topmost shaft (Fig. 9) and counting in a counter-clockwise direction, have secured thereon feed rolls 75 and 76 which cooperate with respective pressure rolls 114 and 113. The feed rolls 75 carried by three of the remaining four feed roll shafts 74, counting from the bottom feed roll in a clockwise direction in Fig. 9, have their peripheries extending slightly beyond the periphery of the cylinder 66 through slots 129 and cooperating with pressure rolls 133 of a lower guide unit which are substantially similar in structure and arrangement to pressure rolls 114. The pressure rolls 133 are secured to shafts 134 having the ends extending through openings formed in a pair of arcuate frame plates 135 of the lower guide unit, and journaled in bearings 136. Bearings 136 are slidable radially in grooves 37 between the outer face of plates 135 and spaced parallel retainer plates 141. Springs 138 are also disposed in grooves 137, in a direction whereby pressure rolls 133 are brought into engagement with feed rolls 75. Each of said plates 135 has secured to the outer periphery thereof a retainer strip 140, against which bears one end of each spring 138. The retainer plates 141 are secured to the outer faces of plates 135 for preventing lateral displacement of springs 138 and bearings 136. A transversely extending arcuate guide plate 142 is located against and secured to the inner periphery of plates 135 in slightly spaced relation away from the outer periphery of cylinder 66, serves to guide a document fed between the above-mentioned feed and pressure rolls and forms part of the lower guide unit. As will be seen in Fig. 9, the forward marginal portion of arcuate guide plate 142 is bent downward in order to facilitate the ejection of documents into tray 143. Guide plate 142 has a plurality of slots through which the peripheries of rolls 133 project to engage feed rolls 75. Bolts or studs 139 extend through arcuate frame plates 135 and upright frame walls 53 and 54 for mounting the lower guide unit in operative position with rolls 133 engaging rolls 75 and with springs 138 under a desired amount of tension for feeding documents. By removal of bolts 139 at the left-hand upper portion as shown in Fig. 9 the bottom guide unit may be swung downwardly on the remaining two bolts 139 for inspection and repair purposes or to remove a jammed document. If desired a latch construction similar to that used on the upper guide unit may be used in place of the upper pair of bolts 139.

Located behind the stationary cylinder 66 and running longitudinally thereof, is a transparent plate 144 (Figs. 5, 9 and 15), preferably glass, through which the document may be exposed to the focal range 67 as it is fed through the machine. The transparent strip 144 is secured at its ends to a pair of brackets 145. Brackets 145 are secured to end plates 117. The above described transparent member 144 is provided so as to guide the document through the focal range. Slightly below transparent member 144 is located the fourth driven feed roll shaft 74, counting from the lowest shaft in a clockwise direction (Fig. 9). In order to insure that a document when passing the focal range is taut so that a properly focused image is presented to the camera, gear 77 secured to the above-mentioned fourth shaft 74, is formed integral with another gear 146 of larger diameter as is best seen in Figs. 2 and 5. The gear 146 meshes with a smaller gear 147 secured to one end of a short stub shaft 148 journaled in the arcuate frame plate 135 of the lower guide unit located at the right of the machine (left Fig. 5).

The other end of stub shaft 148 is provided with a key portion 150 engaging in slot 151 formed at the right-hand end (left Fig. 5) of a removable shaft 152 extending transversely of the machine and longitudinally to the adjacent shaft 74 (Fig. 9). The other end of shaft 152 has a reduced portion 153, which loosely fits within sleeve 154. A compression spring 155 is provided to urge the sleeve axially toward the right (Fig. 5) into cooperation with stud 156 having a rotatable mounting on left-hand arcuate frame plate 135. A pin and slot arrangement 157 is provided to limit the axial movement of sleeve 154.

A plurality of feed rolls 158 are mounted on shaft 152 and have the periphery of each covered with a resilient fabric, such as velvet 160 forming a brush which extends through openings 161 in the arcuate guide plate to cooperate with the periphery of the fourth feed rolls 75 counting from the bottom in Fig. 9. It will be noted at this time that gear 146 is larger than gear 77 and about twice as large as gear 147 with which it is in mesh. Accordingly, brush 160 travels at a much greater speed than feed rolls 75. Normally with shaft 152 in operative position as shown in Figs. 5 and 9, the nap of velvet fabric or brush 160 resiliently bears against the periphery of feed rolls 75. When the document is fed between feed rolls 75 and the velvet brush 160, the nap traveling at a much greater speed than feed rolls 75 will tend to straighten whatever bulge or fold that may be present in the document. Also, due to the resiliency of the nap, once the document is taut, the fabric will slip. When it becomes necessary to replace fabric covering 160, due to wear or adjustment, sleeve 154 (Fig. 5) is moved to the left against the tension of spring 155, until said sleeve is free from stud 156. The entire feed roll assembly may then be removed for such replacement or adjustment.

*Light source*

Figure 3:
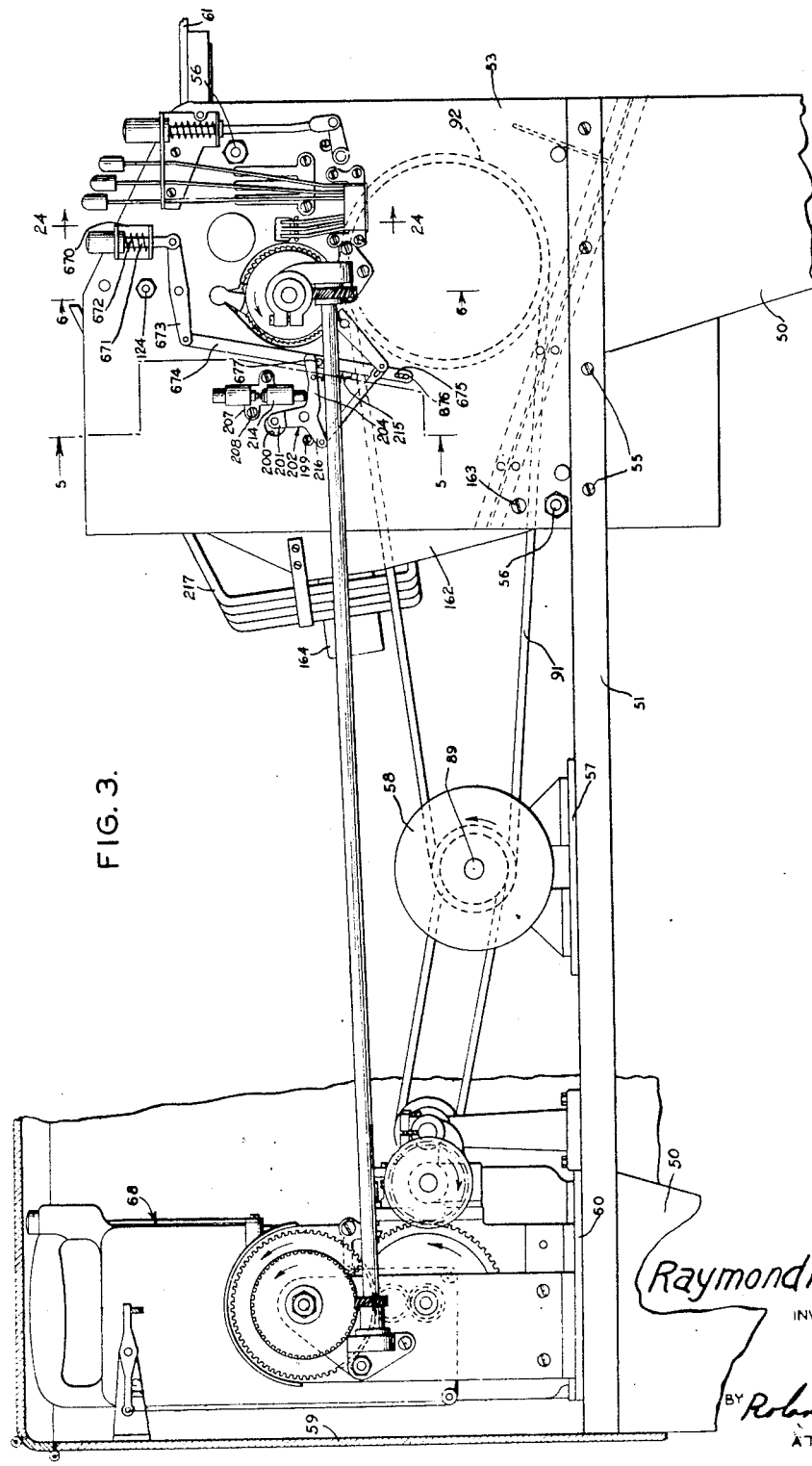
Fig. 3 is a side elevation looking at the left-hand side of the machine with the casing partly removed and partly shown in cross section.
Figure 4:
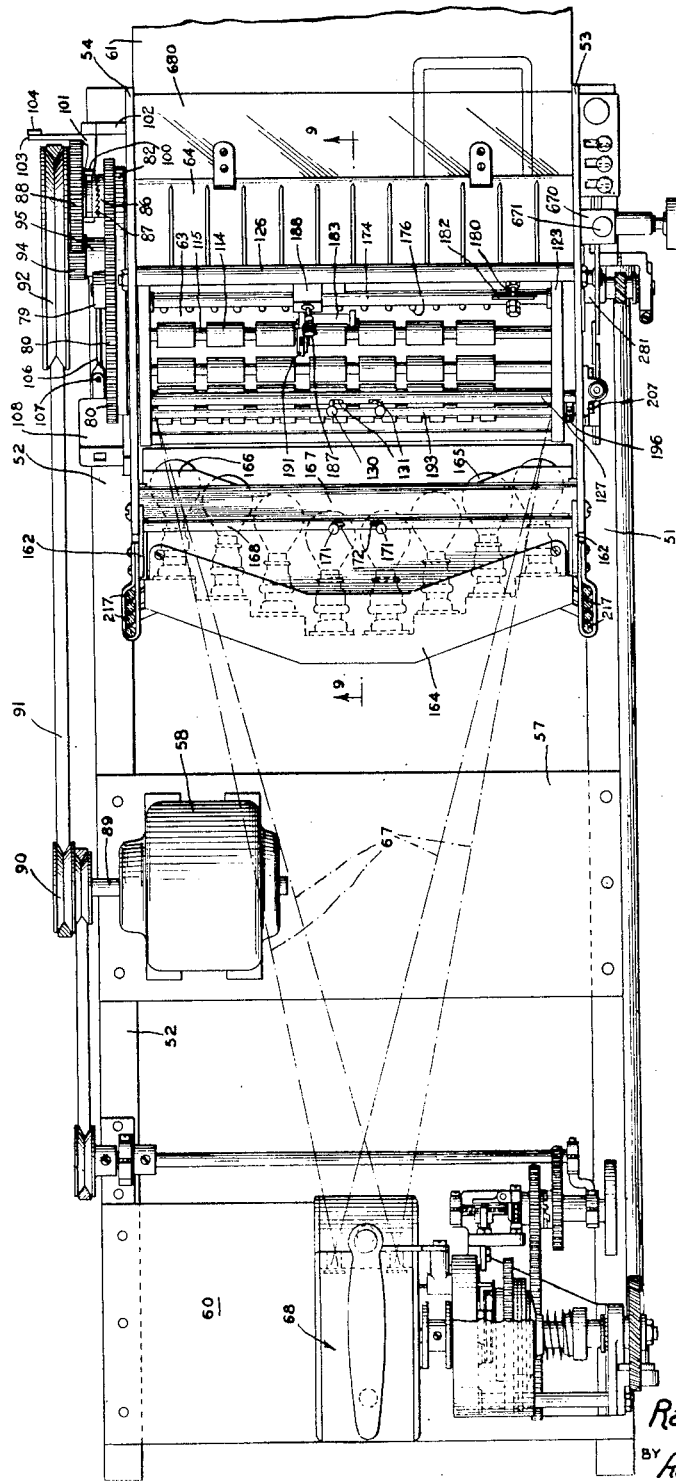
Fig. 4 is a top plan view of the machine with the casing removed.

The source of light for illuminating the document while passing through the focal range 67 consists of a pair of upright end frames or plates 162 located just inside frame walls 53 and 54 (Figs. 2, 3, 4 and 9). Plates 162 are pivotally mounted upon a cross shaft 163 (Fig. 9) fixed at its ends to frame walls 53 and 54. Referring to Figs. 2, 3, 4 and 9, a frame structure 164 is located and secured midway between the upper and lower ends of frame plates 162. Frame structure 164 is provided with a plurality of sockets, eight in number, which are adapted to receive suitable lights 165. As is best seen in Fig. 4, the sockets and lights are arranged in stepped formation in a manner to provide an equal distribution of light rays for illuminating a document while passing through focal range 67. Frame structure 164 is further provided with flanged portions 166 to localize the light rays. Frame plates 162 have an upright cross plate 167 secured to the upper portions thereof in order to prevent any light reflections from entering photographic apparatus 68. The light structure is, therefore, in the form of a unit movable from the effective position shown in full lines to the ineffective and open position shown in dot and dash lines in Fig. 2 in order to provide access for inspection, assembly, repair and adjustment of the document feeding and control mechanisms.

Referring to Figs. 4 and 9, a tube 168 is located between and secured to the upper portions of plates 162. Tube 168 is similar in structure to tube 127 hereinbefore described. A pair of plungers 170 are slidably mounted in tube 168 and have the outer ends adapted to protrude from the ends of tube 168 for engagement in openings formed in end frame walls 53 and 54. Plungers 170 have finger pieces 171 extending through elongated slots 172 in tube 168 and normally projected away from each other by a compression spring 173. When it is desired to move the entire light structure from the full line position to that shown in dot and dash lines (Fig. 2), the finger pieces 171 are moved together against the tension of spring 173 to disengage the outer ends of plungers 170 from the openings in frame walls 53 and 54. This permits free pivotal movement of the light structure.

*Document straightening device*

In order to insure that the documents are fed in a square position past the focal range 67 so the image thereof is presented to a minimum portion of film, a document straightening device is provided in the present machine. Referring to Figs. 4, 5, 9, 10, and 13, it will be recalled that the topmost feed roll shaft 74 has secured midway between the ends thereof a single feed roll 76, rather than a plurality of feed rolls as on the other shafts 74. Cooperating with the single feed roll 76 is a single pressure roll 113. Slightly to the rear and above the feed rolls 76 and 113 (Fig. 9) lies a cross shaft 174 journaled at its ends in arcuate frame plates 117 of the upper guide unit. Cross shaft 174 is notched in the lower periphery thereof to receive and hold a cross bail 175 having a plurality of depending fingers 176 extending from the lower free edge. A spring 177 (Fig. 13) has one end connected to pin 178 fixed to shaft 174 and the other end connected to pin 180 fixed to front wall 125 of arcuate guide plate 63, and urges shaft 174 and bail 175 in a counter-clockwise direction. Clockwise and counter-clockwise movement of shaft 174 is limited by adjustable stops 181 cooperating with upright arm 182 fixed to shaft 174 (Fig. 13). Fingers 176 extend through suitable slots formed in arcuate guide plate 63 and stationary cylinder 66. It will be seen that in normal position as shown in Figs. 9 and 13, fingers 176 are in the path of travel of document D. The above construction is such that, if a document is fed in other than a square position, as shown in full lines in Fig. 10, the leading edge or corner of said document will come to rest against any of the plurality of fingers 176 as the corner of the document will not be driven forward with sufficient force to displace fingers 176 against the tension of spring 177. Further rearward movement of the document will bring the center portion thereof in contact with feed rolls 76 and 113, which will cause the document to be pivoted about the advance corner thereof, until the entire leading edge of said document contacts the maximum number of fingers 176 and presses against said fingers with an increased pressure sufficient to overcome the tension of spring 177 and rock the bail and fingers out of its path.

*Micro-switch*

In the present machine, means are provided whereby the document feeding mechanism is prevented from operating when two or more documents overlapping each other are inadvertently fed past the throat 62 and when documents exceeding a predetermined thickness are fed past said throat.

Referring to Figs. 2, 6, and 14, it will be recalled that the feed roll shafts 74 are continuously driven by a train of gears through normally engaged clutch members 86 and 87, which clutch members may be disengaged by energizing solenoid 108. As is best seen in Figs. 4, 5, and 9, one of the means for energizing solenoid 108 includes a U-shaped bell-crank 183 pivotally mounted upon trunnions 184, carried by a pair of upright brackets 185 mounted on arcuate guide plate 63. Bell-crank 183 is provided with upwardly extending arm 186 carrying at its upper end an adjustment screw 187, the shank of which is adapted, when the bell-crank is rocked, to close a contact within a micro-switch generally designated as 188, adjusted so movements of .002 to .003 of an inch are sufficient to make or break a circuit. Another arm 190 (Figs. 5 and 9) formed integral with bell-crank 183 extends downwardly and has rotatably mounted at the lower end thereof a roller 191, a portion of which extends through and beyond slot 192 in arcuate guide plate 63 and rests upon the outer periphery of stationary cylinder 66. Bell-crank 183 is urged by gravity in a counterclockwise direction and is rocked clockwise as viewed in Fig. 9 by a document passing between roller 191 and cylinder 66. The adjustment screw 187 may be adjusted in such a manner that, when a document of a predetermined thickness passes through the machine, the contacts in micro-switch 188 remain open, and, therefore, solenoid 108 remains deenergized permitting the machine to continue operating. However, when two or more documents are fed at one time, bell-crank 183 will be rocked a greater distance clockwise causing adjustment screw 187 to close the contacts within micro-switch 188 to energize the solenoid, and thus disengage clutch members 86 and 87 to stop the feed rolls from operating. It is necessary to remove the documents before the machine can again be started. The location of bell-crank 183 is such that when two documents operate it and stop the machine, the trailing edges of the documents are still located in throat 62 for manual engagement and removal.

*Light switch*

In the present machine means are provided whereby the previously described lamps 165 are illuminated before the leading edge of a document reaches the focal range 67 and remain illuminated until after the trailing edge of the document is fed beyond the focal range. Referring to Figs. 5, 7, 9, 11, 12, and 15, a cross shaft 193 is journaled at its end in arcuate frame plates 117 and is formed with a radial slot extending longitudinally thereof to receive and hold a cross bail 194. Cross bail 194 is formed at its lower free edge portion with a plurality of fingers 195, which extend downwardly through openings in arcuate guide plate 63 and stationary cylinder 66 and lie in the path of travel of a document D. The left-hand end of shaft 193 (right, in Fig. 5) extends beyond arcuate frame plate 117, and has a depending arm 196 secured to the free end thereof (Figs. 7, 11 and 12). Arm 196 has a cam surface 197 on the free end for cooperation with a roller 198.

The roller 198 extends toward the left passing through an opening 200 in frame wall 53 and is mounted for rotation upon an upright arm 201 of a bell-crank 202. The bell-crank 202 is rotatably mounted upon a stud 203 secured to left-hand frame wall 53, and is provided with forwardly extending arm 204. When bell-crank 202 is rocked by arm 196, arm 204 closes a pair of contacts 205 and 206, thereby closing the circuit to illuminate lamps 165.

Referring to Figs. 11 and 12, contacts 205 and 206 are mounted upon a common bracket 207 of suitable insulating material such as Bakelite, which is secured to the left-hand face of wall 53 by screws 208. Contact 205 extends downwardly through an opening in an inverted cup-shaped member 210 (Fig. 11), and a button 211 of insulating material is secured to its lower end for sliding movement within the inner periphery of said cup-shaped member 210. A spring 212 serves to urge contact 205 away from contact 206 and is limited in such movement by a collar 213 secured to the upper end of contact 205. The inverted cup-shaped member 210 is held stationary within a cylindrical housing 214 formed integral with bracket 207. The contact 206 is mounted for sliding movement in much the same manner as contact 205 and, therefore, the description concerning contact 205 is sufficient for contact 206.

The above construction is such that when the leading edge of a document engages fingers 195 (as shown in Fig. 7) arm 196 is rocked clockwise, thus rocking bell-crank 202 in a counterclockwise direction to the position shown in Fig. 7. In the initial rocking of bell-crank 202 in a counterclockwise direction, arm 204 thereof will move contact 205 upwardly into engagement with contact 206. Further rotation of bell-crank 202 will cause both contacts to move upwardly against the tension of their respective springs 212, and will remain in this position during the time that the fingers 195 feel the presence of a document as shown in Figs. 7 and 15.

When the rear edge of the document has moved out of the path of fingers 195, spring 215 (Figs. 3 and 11) having one end connected to a pin on frame wall 53, and the other end connected to arm 204 of bell-crank 202 will cause cross bail 194 and fingers 195 thereof to return to normal position, as shown in Fig. 9. The circuit through contacts 205 and 206 is not broken during the return movement of bail 194 until just before it reaches its normal position. This provides a delayed action in opening the light circuit so the rear edge of the document has passed the focal range 67 before the lights are extinguished. This delayed action is obtained by springs 212 keeping the sliding contacts 205 and 206 engaged for sliding movement through a portion of the return movement of cross bail 194 and bell-crank 202 and until the collar on contact 206 engages the upper end of bracket 207. In order that a fine adjustment may be obtained between contacts 205 and 206, upright frame wall 53 has secured thereon an adjustable eccentric 199 which cooperates with a third arm 216 formed integral with bell-crank 202 for limiting movement of said bell-crank.

Friction eliminating device for document feeding

It is an established principle that, when an element is fed between a pair of rolls, the element will tend to travel in a line perpendicular to the line joining the centers of the rolls. In view of this principle it will be seen that, if the center of arcuate guide plate 63 lies on the line joining the centers of the rolls 114 and 75, the document, tending to travel in a line perpendicular to the line of centers, will be deflected by the plate 63. However, in doing so practically the entire document will at some time or other rub against the inner periphery of the plate 63 causing undue friction. Also, it will be seen that the leading edge of the document may during its travel along an arcuate path strike against an obstruction which in this case may be the transparent member 144 preventing proper feeding of the document and causing possible damage to the document and machine. In order to eliminate a maximum amount of friction and also to prevent jamming due to improper feeding of the document the feed roll structure is arranged in the following manner:

Feed rolls 114 as shown in Figs. 9 and 15 are offset in a counterclockwise direction, and in the direction of document feed relative to feed rolls 75, that is the centers of rolls 114 do not lie in the radial planes intersecting the center of cylinder 66 and the centers of rolls 75. The offset is such that the leading edge of the document being fed perpendicular to the line joining the centers of the feed rolls 75 and 114 will not contact the inner periphery of the arcuate guide plate 63 until it has traveled a considerable distance beyond the two feed rolls and slightly before it is gripped by the following set of feed rolls. While only four sets of feed rolls 75 and 114 are shown as offset in the drawings (Fig. 9), it will be understood that the remainder of the sets of feed rolls may be similarly offset if desired without departing from the spirit of the invention.

Telltale for the lights

Referring to the circuit diagram disclosed in Fig. 16, the lights 165 are connected in parallel. In this manner should one light fail to go on for any reason, the rest of the lights remain illuminated. When one or more lights go out the desired photographic results cannot be obtained. Therefore, all of the lights 165 must be effective to obtain the desired photographic results. It is, therefore, necessary that means be provided whereby the operator is signaled whenever one or more of the lights 165 has gone out. In the present machine, and as may best be seen in Figs. 1, 2, 3, 4 and 9, means are provided for obtaining the above result and for signaling to the operator upon the condition of the lights. This means provides an illumination conducting rod 217, such as Lucite (methyl methacrylate) for each lamp 165. The lower end of each rod 217 extends through an opening in one of the flanged portions 166 and is positioned so as to catch the light rays of its respective lamp 165. The rods are provided with a plurality of bends to extend around and to the rear of frame structure 164 and flanged portions 166, then upwardly at the sides of the machine near plates 162 beyond focal range 67, and then toward the front of the machine where the upper ends terminate in uniform spaced relation for observation through openings in panel 218 (Figs. 1 and 9). The rods are suitably fastened to cross plate 167. The upper ends of the rods are arranged in the same order in panel 218 as the lower ends and lamps 165. Panel 218 (Fig. 1) forms part of the front wall of casing 59.

A suitable camera, film drive mechanism for feeding the film in the camera controlled by the document feed, an auxiliary film feeding mechanism, and suitable signaling and control mechanism is also provided for operation in conjunction with the above described document feed and lighting structure. The construction of these several features is fully shown and described in the aforementioned application.

Circuit diagram

Referring to Fig. 16, the present machine utilizes four separate and distinct circuits connected to the power supply line indicated by reference numerals 655 and 656 under control of a main switch 657. The first of said circuits is connected in parallel with the main line to operate motor 52 when switch 658 is closed. Switch 658 is mounted on the upper front portion of casing 59 as shown in Fig. 1. A pilot light 660, connected in the motor circuit, is provided to signal the operator whenever the motor is running. This pilot light is mounted adjacent switch 658 and is shown in Fig. 1.

The second circuit includes a voltage control unit 661 utilizing electronic tubes of a character well known in circuits of this type. Lamps 165 are connected to said voltage control unit 661 in parallel, the circuit being under control of contacts 205 and 206.

The third and fourth circuits provide control means for indicating when the camera is not properly operating to photograph documents and also for controlling the operation of solenoid 109 to stop the document feed under conditions described in the aforementioned application.

It will be noted that micro-switch 183 and contacts 666 and 667 are in parallel with each other and in series with solenoid 109 for independent operation of the solenoid.

It often becomes necessary that different groups of documents may be photographed upon the film with a space of unexposed film between the different groups or a predetermined space between the different documents fed through the machine. For this reason, mechanism is provided whereby the film drive mechanism is operated independently of the document feeding mechanism.

Referring to Figs. 3 and 4, located to the left of the upright frame wall 53 and secured thereto is a U-shaped bracket 670, upon which is mounted for vertical movement a plunger 671 resiliently urged in an upward direction by a spring 672. The plunger 671 is connected at its lower end to the forwardly extending arm of a lever 673, pivotally mounted upon the frame wall 53. The rearwardly extending arm of lever 673 is connected to the upper end of a link 674 mounted for vertical movement at its lower end upon a pin 675 engaged in slot 676 therein. Located beneath and in the path of the arm 204 of bell-crank 202 is a pin 677 adapted when the link 674 is raised, through operation of plunger 671, to rock the bell-crank in a counter-clockwise direction (Fig. 3) to engage the clutch members 280 and 298 in a manner described in said aforementioned application to start the operation of the film feed drive mechanism.

*Operation*

The present invention is particularly adapted for use in the photographing of bank checks and statements although it is equally adaptable for use in photographing other types of documents. Various sizes of documents can be photographed in the present machine, the limit of size being determined by the dimension of the document in one direction only because the capacity of this machine is limited only by its width, particularly the width of the throat 62 and the length of stationary cylinder 66. The transverse dimension of the document as it is fed into the machine is, therefore, the only controlling factor on the size of document that can be photographed in the machine while the dimension of the document in line with the direction of feed can be any length. This result is obtained in a manner that will be clear from the following description of the machine's operation. A camera is provided with a roll of film which is then inserted into the machine in the manner described in the aforementioned application to condition the machine for photographing documents.

The machine is attached to a suitable source of current supply controlled by a main switch 657 and control switch 658 is manually operated to the "on" position starting motor 58 and energizing pilot light 60. This starts motor 52 so that when the camera is properly inserted in the machine and it is ready to photograph documents, the motor will operate the document feed mechanism hereinabove described by continuously rotating shaft 78 and all of the feed rollers driven therefrom.

Suitable indicia are provided for simultaneous photographing with the documents as described in the aforementioned application. The arrangement of these indicia is set to secure the display of the desired indicia in the photographing of each document. Then the operator of the machine may take a group of checks to be photographed and place them on feed table 61. The checks are fed into throat 62. The operator holds a pile of checks and proceeds to feed them into throat 62 one at a time in successive order as rapidly as the checks may be manually fed. The checks are fed so that the top edge of the check becomes the leading edge with the face of the check upward and facing toward the camera as it passes through the photographing plane. The check first engages the top feed roll 76 on one of shafts 74 and the single center roller 113 as shown in Fig. 10 where it is fed into the straightening device for engagement of the leading edge with fingers 176 to straighten the position of the check in the machine. The check is now gripped at between single roller 113 and feed roller 76 and positively fed to the left, as shown in Fig. 9, about stationary cylinder 66 under the upper guide unit on the inside of plate 63.

The leading edge of the check in this feeding operation next engages roller 191. This roller operates lever 190 of the mechanism for preventing the feeding of two checks or other documents simultaneously. Therefore, in the event two thicknesses of paper such as two checks engage this roller 191 in overlapped relation, lever 190 is operated to a sufficient extent to close microswitch 189, energize solenoid 180, and disengage the clutch driving feed rollers 75 and 76. Since this stops the feeding of two documents at the feed end of the machine, the length of a check from the top to the bottom edge thereof is sufficient for the trailing edge or bottom of the document to be manually engageable in throat 62 so that it may be withdrawn manually from the machine. As soon as the removal of the two documents is obtained or at least one of them, the machine is then set in operation again to feed checks toward photographing position.

The leading edge of the check next engages fingers 195 for rotating shaft 193 which in turn operates film crank lever 202 in a counter-clockwise direction as illustrated in Fig. 11 engaging contacts 205 and 206 for closing the light circuit and illuminating lamp bulbs 165. The operation closes the lamp circuit as soon as fingers 175 have moved only a short distance of its complete arc of travel and before the leading edge of the document reaches the photographing position. As the leading edge of the check or other document reaches the photographic plane 67 immediately in the rear of glass plate 144, the lamps 165 are lighted to full brilliancy. The operator may at this point observe whether all of the lamps are lit and the document is being properly fed by looking at instrument board 216. The observation also indicates when the document has reached and is passing through the photographing position, and when it leaves the photographing position.

Immediately after the circuit to lamps 165 is closed, bell crank 202 is operated to a further extent to move clutch member 280 to drive shaft 303 and move the film in the camera through the film drive mechanism described in the aforementioned application. The moving of the film begins as the leading edge of the document reaches the photographing field 67 and continues during the movement of the document through the photographing field. The movement of the document and the film is such that the surface speed of each is proportionate and in opposite directions so that the image of the check passing through the machine is photographed onto the film in the camera while both are moving.

As the trailing edge of the document approaches the photographic field 67, the ends of fingers 195 drop off of the trailing edge of the check and move back into the position shown in Fig. 9. This restores bell crank 202 to its initial position of rest. In the first part of the return movement of fingers 195 toward the initial position, clutch member 280 is disconnected from the driving portion of the clutch to stop the feed of film. As soon as clutch 280 is disengaged, arm 331 stops rotation of the film feed mechanism to prevent the feeding of too much film past the aperture slot in the camera. Then as fingers 195 move almost to the initial position, bell crank 202 is operated sufficiently to disengage contacts 205 and 206 and open the light circuit. The timing of the operation of bell crank 202 in this manner is such that the trailing edge of the document will be leaving the photographic field as the lights are cut off and the film feed is stopped.

The document or check is then fed through the lower feed section of the feeding mechanism of the machine as illustrated in Fig. 9 by feed rolls 75 and idle rolls 133 until it is discharged at the bottom of the periphery of stationary cylinder 66 into tray 143 where it will be delivered to rest face down in the tray. In this manner each succeeding check will be arranged in the tray in the same order as it was fed into the machine with respect to the other checks in a series. Subsequent checks will operate all of the parts of the machine mechanism in the manner above described.

During the feeding of checks as above described, a plate 680 is moved to the position illustrated in Fig. 1 for closing entrance into the machine directly rearwardly along the feed table. When it is desired to photograph statements or other similar documents in the machine, plate 680, as shown in Fig. 1, is swung from the position shown in Fig. 1 so as to close the opening into the throat 62. The statements or other documents piled on feed table 61 are then fed by the operator one at a time into the machine below inclined auxiliary table 64 for engagement between the single feed roll 113 at the entrance to the feeding device for the machine for gripping between this roller 113 and its contacting roller 76. The statement is then engaged with the straightening mechanism including fingers 176 so as to be straightened for feeding through the photographing position. The operation of the machine is identical with the feeding of a check as above described, since the leading edge operates each of the controls in the same manner as above described in connection with the feed of a check.

The operation of the camera and the feed mechanism of the machine is maintained continuously during the passage of the statement or other document through the photographing plane until the trailing edge of the statement passes the photographing plane and allows the fingers 195 to return to the normal position shown in Fig. 9 for stopping the film feed and extinguishing the lights. When statements are photographed it is usually desirable to adjust tray 143 so that the forward end thereof as shown in Fig. 1 is moved forwardly to a greater extent so that upon discharge of the statement or other similar document from the feeding mechanism of the camera, the forward edge can engage against the front end of tray 143 while the rear end upon being discharged by the feed mechanism can drop into the rear portion of the tray slightly in advance of the discharge point of the feeding mechanism.

The document feeding mechanism of the present invention causes the documents to be held in an arcuate shape as they are moved past the photographic field of the camera indicated by the numeral 67. Due to the fact that checks and similar documents may have been folded, wrinkled or buckled before being fed into the camera for photographing, it is difficult to maintain them in a uniform position during feeding into the camera. The shaping of the document into arcuate form during the feeding operation materially aids in maintaining the face of the documents between the sides thereof as it passes through the photographic plane in an equidistant relation with respect to the camera. This is a highly desirable feature due to the fact that with the overall size of the document photographing machine and the percentage of reduction of the image on the film, the optics of the camera lens is such that there is very little depth of focus. By the means employed in feeding documents the face of each document is maintained substantially uniformly in focus with the film to prevent folds, bulges and the like from causing portions of the document to move slightly out of focus and thereby blur the image on the film.

The feeding mechanism also obtains the efficient and rapid feeding of documents for photographing with a series of moving parts having a minimum of weight and inertia components to thereby eliminate the problem of overcoming inertia to start and stop the moving parts of the camera during the feeding and photographing operations.

The documents are also delivered in the front of the machine immediately below feed table 61 in a convenient position for ready removal by the operator. All of the controls and indicating means on the machine for manual operation and observation are also at the front of the machine to provide convenience and facilitate the convenient and efficient control and operation of the machine by the operator.

The invention claimed is:

1. In a document photographing machine, a support having a curved document guide portion, a plurality of feed shafts rotatable in said support in spaced parallel relation in a curved path inwardly of and concentric with said guide portion, feed rolls on said feed shafts having peripheral portions projecting slightly beyond said document guide portion, a plurality of idler shafts journaled outwardly beyond said guide portion in spaced parallel relation, said idler shafts being opposite said feed shafts in cooperative parallel relation, feed rolls on said idler shafts having peripheral portions engaging the peripheries of corresponding feed rolls on said feed shafts, means mounting said idler shafts for normally and resiliently projecting and retaining the feed rolls thereon in engagement with the feed rolls on said feed shafts, and drive means for rotating all of said feed shafts in the same direction simultaneously for cooperation to grip and feed documents in one direction about said curved path between pairs of engaged feed rolls, said drive means comprising a driven ring gear, plural spur gears disposed within the circumference thereof and meshing therewith and each of said spur gears being secured to a respective feed shaft.

2. In a document photographing machine, a support having a curved document guide member, a plurality of feed shafts rotatable in said support in spaced parallel relation at the inner side of said curved guide member and in a curved path concentric with said guide member, feed rolls on said feed shafts having peripheral portions projecting through openings formed in said guide member and extending slightly beyond the outer surface of said guide member, a pair of guide units detachably mounted in said support and arranged in adjacent but spaced relation beyond the outer face of said curved guide member for cooperation therewith in guiding documents about said guide member, each unit having a plurality of idler shafts journaled therein for radial movement, means for normally urging said shafts toward said guide member, there being a corresponding number of shafts to the number of said feed shafts, the shafts in said guide units being arranged in opposed relation to corresponding feed shafts, feed rolls on said idler shafts having the peripheries engaged with the feed rolls on said feed shafts for gripping and feeding a document therebetween, and a single driving member engaged with means on all of said feed shafts for rotating said feed shafts in the same direction in the feeding of documents over said curved guide member, the feed rolls on said idler shafts being driven from said feed shafts in the feeding of documents, and said guide units being detachable from said frame to provide ready access to all parts of said feed mechanism.

3. In a document photographing machine, a support formed to provide a curved guide surface, a plurality of feed shafts journaled in said support in spaced parallel relation and in a curved relation corresponding to said guide surface in inwardly spaced relation with respect thereto, a plurality of idler shafts one corresponding to each feed shaft carried by said support for movement toward and from corresponding feed shafts, a plurality of said idler shafts being offset in the direction of feed over said guide portion relative to the corresponding feed shafts, feed rolls mounted on said feed and idler shafts normally having peripheral engagement for feeding cooperation to grip and feed documents therebetween, means normally urging said idler shafts toward their corresponding feed shafts, and means for driving said feed shafts whereby the offset idler shafts with the feed rolls thereon cooperating with the feed rolls on the feed shafts grip and bend a document as it travels therebetween to curve the feed of said document to correspond with the curved path defined by said guide portion.

4. In a document photographing machine, a support having a curved guide portion, a plurality of feed shafts rotatable in said support in spaced parallel relation and arranged in the same curved relation as said guide portion in inwardly spaced relation, feed rolls mounted on said feed shafts having peripheral portions projecting slightly beyond said curved guide portions, an upper guide unit pivotally mounted in said support for movement between operative and open inoperative position relative to said curved guide portion, manually operable latch means for retaining said upper guide unit in operative position, idler shafts journaled for substantially radial movement in said guide unit toward and from corresponding feed shafts, feed rolls mounted on said idler shafts for peripheral engagement with the feed rolls on said feed shafts for gripping and feeding documents therebetween, a plurality of said idler shafts being mounted in offset relation in the direction of feed of documents about said curved guide portion relative to the corresponding feed shafts, whereby the feed rolls on said idler and feed shafts will cooperate to successively bend a document into curved relation about said curved guide portion to substantially conform with the curvature thereof during feeding over said curved guide portion, a lower guide unit carried by said support, a plurality of idler feed rolls rotatable in said lower guide unit for cooperation with feed rolls on corresponding feed shafts for receiving a document fed by the upper guide unit and its cooperating feed rolls for conveying said documents between said lower guide unit and curved guide portion, said guide units being spaced to provide a portion therebetween forming a photographic plane for documents fed over said curved guide portion.

5. In a document photographing machine, a support having a curved document guide portion, a plurality of feed shafts rotatably mounted in said support in spaced parallel relation and arranged in a curved relation inwardly of and corresponding to said curved guide portion, feed rolls on said feed shafts having peripheral portions projecting slightly beyond said curved guide portion, a plurality of idler rolls carried by said support and resiliently pressed into peripheral engaged relation with the feed rolls on said feed shafts for cooperation therewith in feeding documents therebetween about said curved guide portion, said curved guide portion having a photographic plane across the central portion thereof, a feed shaft rotatably mounted in said support adjacent said photographic plane at the side thereof beyond said plane in the direction of feed of documents over said curved guide portion, said shaft being arranged in spaced parallel relation radially outward of one of said feed shafts, and a feed roll mounted on said outwardly disposed rotatable shaft formed with radially projecting fibers for cooperation with the feed roll on the corresponding feed shaft to grip and feed a document, means for driving said feed shafts at a uniform speed in one direction for feeding documents about said curved guide portion, and means driving said last-mentioned feed shaft at a higher rate of speed than said first-mentioned feed shafts whereby a document engaged by the radially projecting fibers on the feed rolls thereof will be drawn tightly across said curved guide surface throughout said photographic plane in order to maintain a document being fed through said machine substantially accurately in said photographic plane during the movement of a document through said plane.

6. In a document photographing machine, a support formed with a guide portion for guiding documents through said machine, a photographing plane provided intermediate the ends of said guide portion, a plurality of pairs of feed rolls having peripheral engagement between the rolls of each pair rotatably mounted in said support with the engaged portions of the peripheries adjacent the surface of said guide portion for receiving, gripping and feeding documents over said guide portion through said machine past said photographing plane, another feed roll rotatably mounted in said support with its periphery positioned adjacent the guide portion for engaging one side of documents as they leave the photographing plane, and a brush rotatably and detachably mounted in said support having its periphery engaging the periphery of said other feed roll, means for driving said feed rolls at a uniform speed for gripping and feeding documents over said guide portion and through said photographing plane, and means for driving said brush at a greater speed than said feed rolls operable to draw documents taut during their passage through said photographing plane to eliminate wrinkles and the like in said documents while they pass through said photographing plane.

7. In a document photographing machine, a support, a plurality of pairs of feed rolls rotatably mounted in said support and arranged to provide a path of feed for a document through said machine, the rolls of each pair having peripheral engagement for gripping a document therebetween for feeding between the rolls of an adjacent pair in the movement of a document through said path in said machine, a photographing plane provided in said path through which documents are fed by said feed rolls, a single feed roll positioned to engage a document as it leaves the photographing plane, a brush roll having peripheral engagement with said single feed roll to engage a document as it leaves the photographing plane, means for driving all of said feed rolls at a uniform speed for conveying documents through said machine and through said photographing plane, and means driven by said driving means for driving said brush roll at an increased speed for tensioning documents in said photographing plane whereby documents passing through said photographing plane are held substantially flat and free from wrinkles.

8. In a document photographing machine, a photographing plane in said machine, document feeding means for feeding documents through said photographing plane including document straightening means, and a brush rotatably and detachably mounted in said machine and cooperating with said document feeding means for engaging a document as it leaves said photographic plane, and means for rotating said brush at a rate of speed higher than twice that of the document feeding means for tensioning a document in the photographic plane into a substantially flat position free from bulges and wrinkles, and said brush being arranged and adapted to be detached from said brush rotating means for the removal and replacement thereof.

9. In a document photographing machine, a support having a partially cylindrical guide portion for the passage of documents thereover in movement through the machine, a plurality of feed rolls rotatably mounted in said support inwardly of said guide portion in spaced parallel relation and arranged in concentric relation to said partially cylindrical guide portion with a portion of the periphery of each feed roll extending beyond the cylindrical guide portion, a guide unit hingedly mounted in said support, a plurality of idler rolls rotatably mounted in said guide unit for peripheral engagement of each roll with one of said feed rolls for cooperation to grip and feed documents therebetween about said guide portion, means for retaining said guide unit in operative position for feeding documents between said rolls, said guide portion having a photographic plane at one end of said unit, brush driving means rotatable in said support, a brush detachably mounted in said brush driving means and having peripheral engagement with one of said feed rolls, said brush and brush driving means being positioned adjacent said photographic plane on the side opposite said guide unit, and means for driving said feed rolls at a uniform speed and said brush at a higher speed than said feed rolls for gripping documents as they pass through the photographic plane and drawing them taut while in the photographic plane, said guide unit being movable on its hinge away from said guide portion and feed rolls including said brush to provide access to said feed rolls, guide portion and brush so that said brush can be manipulated for detachment from said brush mounting.

10. In a document photographing machine, a support having a pair of spaced parallel end frame walls, a stationary cylinder extending between said walls, a pair of end walls engaged with opposite ends of said stationary cylinder for supporting said cylinder, means securing said end walls together to support said cylinder and also to attach the assembled end walls and cylinder to one of said frame walls, said cylinder having the outer face thereof defining a document feed path through said machine, a plurality of feed shafts rotatably mounted in spaced parallel relation in said end plates within said cylinder and in circumferential relation concentric with said cylinder, each shaft having one end projecting beyond the end wall supporting said cylinder, a plurality of feed rolls mounted on said feed shafts having the peripheries extending through openings in said cylinder and slightly beyond the outer surface thereof, a gear mounted on the end of each of said feed shafts beyond said end frame wall, a main drive shaft rotatably supported by said frame walls, a ring gear mounted on said main drive shaft meshing with all of the gears on said feed shafts for simultaneously driving all of said shafts in the same direction at a uniform speed in the rotation of said main drive shaft, an upper guide unit extending between said frame walls adjacent to the outer face of said stationary cylinder and pivotally connected to said frame walls at one end for pivotal movement into an operative position adjacent the outer face of said cylinder and into an open inoperative position extending away from said cylinder, said unit having a partially cylindrical guide plate arranged in adjacent spaced concentric relation outwardly of said stationary cylinder in the operative position of said unit, a plurality of idler rolls journaled in said unit and having the peripheries extending through openings in said guide plate for peripheral engagement with the feed rolls on said feed shafts in the operative position of said unit, means carried by said unit for resiliently projecting said idler rolls into peripheral engagement with the feed rolls on said shafts, and latch means for retaining said guide unit in operative and open positions respectively, whereby said guide unit has the idler rolls thereof cooperate with the feed rolls on said feed shafts in the rotation thereof for gripping and feeding documents between the outer surface of said cylinder and the inner surface of said guide plate for movement into a photographing plane adjacent one end of said unit.

11. In a document photographing machine, a support having a curved guide portion for the passage of documents through said machine, a guide unit hingedly mounted on said support and having a curved guide portion for cooperation with the curved guide portion of said support to guide a document in passage through said machine, document feeding means mounted in said support and guide unit for cooperation to feed a document between said curved guide portions, latch means for retaining said guide unit in operative position for guiding and feeding documents in cooperation with the curved guide portion of said support and operable to release said guide unit for hinging movement into an inoperative position where the curved unit extends away from the curved guide portion of said support in order to provide access to said document feeding means, an illuminating unit having a supporting frame hingedly mounted at one end in said support below said guide unit and carrying illuminating means movable with said unit into close proximity to the lower end of said guide unit for illuminating a photographing plane formed at a predetermined position on said curved guide portion, latch means for retaining said illuminating unit in said close proximity to said photographing plane and operable to release said illuminating unit for swinging movement on its pivotal mounting in said support into an open inoperative position whereby said guide unit may be swung into its outwardly extending position relative to said curved guide portion.

12. In a document photographing machine, a support, a photographing plane on said support, document feeding means on said support having a pivoted guide unit mounted on said support to swing into operative and inoperative positions, a latch for retaining said guide unit in operative position, an illuminating unit including plural lamps disposed in an arcuate path relative to said plane, said illuminating unit having a frame pivoted on said support at one end and movable into close proximity to said feeding means and guide unit in operative position, latch means for retaining said illuminating unit in operative position; and means on said illuminating unit for illuminating said photographic plane when in operative position, said latch means when released providing for swinging movement of said illuminating unit away from said feeding means whereby said guide unit may be released and moved into inoperative position to provide ready access to said units and feeding means for inspection, cleaning and repair.

13. In a document photographing machine, a support, a photographing position formed on said support, document feeding means on said support for gripping and feeding a document past said photographing position having a hinged feed unit movable from an operative position in adjacent relation to said photographing position to an open outwardly extending inoperative position to provide access to said feeding means for servicing, a frame member pivoted on said support at one end and having the opposite end extending over said document feeding means and feed unit in adjacent relation thereto when in operative position and movable away from said feed unit to an inoperative position to provide access to said feed unit and provide for swinging movement of said feed unit to inoperative position, illuminating means mounted on said frame member operable to project light onto said photographing position in the operative position of said frame member, document actuated means operable when a document is passing through said photographing position to operate said illuminating means to illuminate said photographing position and means mounted on said frame member for transmitting light from said illuminating means to a position adjacent that where documents are fed into said feeding means to indicate when said illuminating means is operating and a document is in said photographing position.

14. In a document photographing machine, means for feeding documents through a photographing position, means for illuminating documents during passage through said photographing position, means for operating a camera to photograph a document passing through said photographing position, main drive means connected to said feed means for operating said feed means to feed documents through said photographing position at a given rate of speed, a control finger pivotally mounted in association with said feed means and in advance of said photographing position in the direction of feed of documents for engagement and operation of said finger by a document being fed for movement of said finger from an inoperative to an operative position by a document, yieldably mounted contact means comprising contacts movable one to the other, one of said contacts yieldably responsive to the initial operation of said control finger to engage the other of said contacts for operating said illuminating means to illuminate said photographing position, both of said contacts arranged to yieldably move with said finger during the continued movement thereof, and camera drive actuating means controlled by said finger actuable immediately prior to the completion of the movement of said finger for connecting said camera drive means with said main drive means to secure operation of a camera to photograph a document passing through said photographing position, said control finger returning to inoperative position upon the trailing edge of the document passing thereunder at a predetermined rate of speed proportionate to the speed of document feed, said camera actuating drive means arranged to disconnect said camera drive means from said main drive upon the initial return operation of said finger, said contacts arranged to return in engaged position for substantially the length of the return movement of said finger, said contacts disengaging immediately prior to the completion of said return movement, and the trailing edge of said document arranged to traverse the photographing position prior to said control finger reaching the inoperative position according to said predetermined rate of speed of said finger to document feed.

15. In a document photographing machine, a support having a pair of spaced parallel frame walls and a guide portion for documents extending between said frame walls for guiding documents through a photographing position, a plurality of pairs of feed rolls having the peripheries of the rolls in each pair engaging one another for cooperation to grip and feed documents about said guide portion and through said photographing position, a main drive shaft rotatably mounted in said frame walls having means engaging said feed rolls for driving the same in the rotation of said drive shaft, a clutch on said drive shaft, camera drive means mounted on one of said frame walls and driven by said clutch from said main drive shaft, illuminating means mounted in said support for illuminating said photographing position, a lever pivotally mounted on one of said frame walls and connected with said clutch for controlling engagement and disengagement thereof, a contact for controlling operation of said illuminating means mounted on the last mentioned frame wall and operated by said lever, and a control finger for operating said lever pivotally mounted on said support with a free end extending across said guide path adjacent a pair of feed rolls in advance of said photographing position and operable by a document fed by said feed means in initial movement from an inoperative position toward an operative position to move said lever through an initial movement for engaging said contacts to operate said illuminating means and in subsequent movement to operative position by a document to further operate said lever to cause engagement of said clutch for driving said camera drive means from said main drive shaft during the continuous feeding of a document past said control finger until the trailing edge of said document leaves said control finger whereupon said finger returns to the inoperative position and in the return movement first controls operation of said lever to disengage said clutch and subsequently during the latter part of its movement to inoperative position disengages said contacts for rendering said illuminating means inoperative, said clutch and illuminating means being rendered inoperative after the trailing edge of said document has passed said photographing position.

RAYMOND M. HESSERT.

(References on following page)

REFERENCES CITED

The following references are of record in the file of this patent:

UNITED STATES PATENTS

| Number | Name | Date |
|---|---|---|
| 1,339,315 | Bevan et al. | May 4, 1920 |
| 1,344,896 | Jobke | June 29, 1920 |
| 1,957,889 | Hopkins | May 8, 1934 |
| 1,966,348 | Hughey | July 10, 1934 |
| 1,976,346 | Hughey | Oct. 9, 1934 |
| 1,993,178 | Mitchell | Mar. 5, 1935 |
| 2,150,243 | Page | Mar. 14, 1939 |
| 2,177,135 | Fassel | Oct. 24, 1939 |
| 2,198,443 | Paul | Apr. 23, 1940 |
| 2,377,525 | Schutt | June 5, 1945 |
| 2,403,711 | Egan | July 9, 1946 |
| 2,435,099 | Pratt | Jan. 27, 1948 |

FOREIGN PATENTS

| Number | Country | Date |
|---|---|---|
| 269,140 | Great Britain | May 3, 1928 |